US007273164B2

(12) United States Patent
Herring

(10) Patent No.: US 7,273,164 B2
(45) Date of Patent: Sep. 25, 2007

(54) POSTAGE METERING SYSTEM

(75) Inventor: William James Herring, Essex (GB)

(73) Assignee: Neopost Indutrie SA, Bagneux (FR)

( * ) Notice: Subject to any disclaimer, the term of this patent is extended or adjusted under 35 U.S.C. 154(b) by 0 days.

(21) Appl. No.: 10/503,178

(22) PCT Filed: Jan. 31, 2003

(86) PCT No.: PCT/GB03/00395

§ 371 (c)(1),
(2), (4) Date: Aug. 24, 2005

(87) PCT Pub. No.: WO03/065314

PCT Pub. Date: Aug. 7, 2003

(65) Prior Publication Data

US 2006/0000883 A1 Jan. 5, 2006

(30) Foreign Application Priority Data

Jan. 31, 2002 (GB) ................................ 0202269.7

(51) Int. Cl.
*G06F 17/00* (2006.01)
*G06Q 99/00* (2006.01)
*H04K 1/00* (2006.01)
*H04L 9/00* (2006.01)
*G07B 17/02* (2006.01)

(52) U.S. Cl. ......................... 235/375; 705/60; 705/401

(58) Field of Classification Search ................ 235/375; 705/60, 401
See application file for complete search history.

(56) References Cited

U.S. PATENT DOCUMENTS 4,484,307 A * 11/1984 Quatse et al. ............... 705/410
4,629,871 A * 12/1986 Scribner et al. ............ 235/375
4,812,965 A 3/1989 Taylor
5,613,007 A * 3/1997 Balga, Jr. .................... 380/51
5,671,146 A * 9/1997 Windel et al. .............. 705/410
5,745,887 A * 4/1998 Gargiulo et al. ............ 705/410
5,796,834 A 8/1998 Whitney et al.
5,917,924 A * 6/1999 Herbert ....................... 382/101
5,984,174 A * 11/1999 Kato et al. .................. 235/375
6,002,095 A * 12/1999 Bodie et al. ................ 209/584
6,039,257 A * 3/2000 Berson et al. .............. 235/468
6,587,843 B1 * 7/2003 Gelfer et al. ................. 705/60
2001/0039625 A1 * 11/2001 Ananda ....................... 713/202
2001/0044783 A1 * 11/2001 Weisberg et al. ............. 705/62
2002/0010688 A1 * 1/2002 Shah et al. ................. 705/405

(Continued)

FOREIGN PATENT DOCUMENTS

EP 0 782 110 7/1997

(Continued)

*Primary Examiner*—Daniel Walsh
(74) *Attorney, Agent, or Firm*—Renner, Otto, Boisselle & Sklar, LLP.

(57) ABSTRACT

A postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, one or both of log data relating to such use and report such use to a security center.

7 Claims, 1 Drawing Sheet

U.S. PATENT DOCUMENTS

Figure 1:
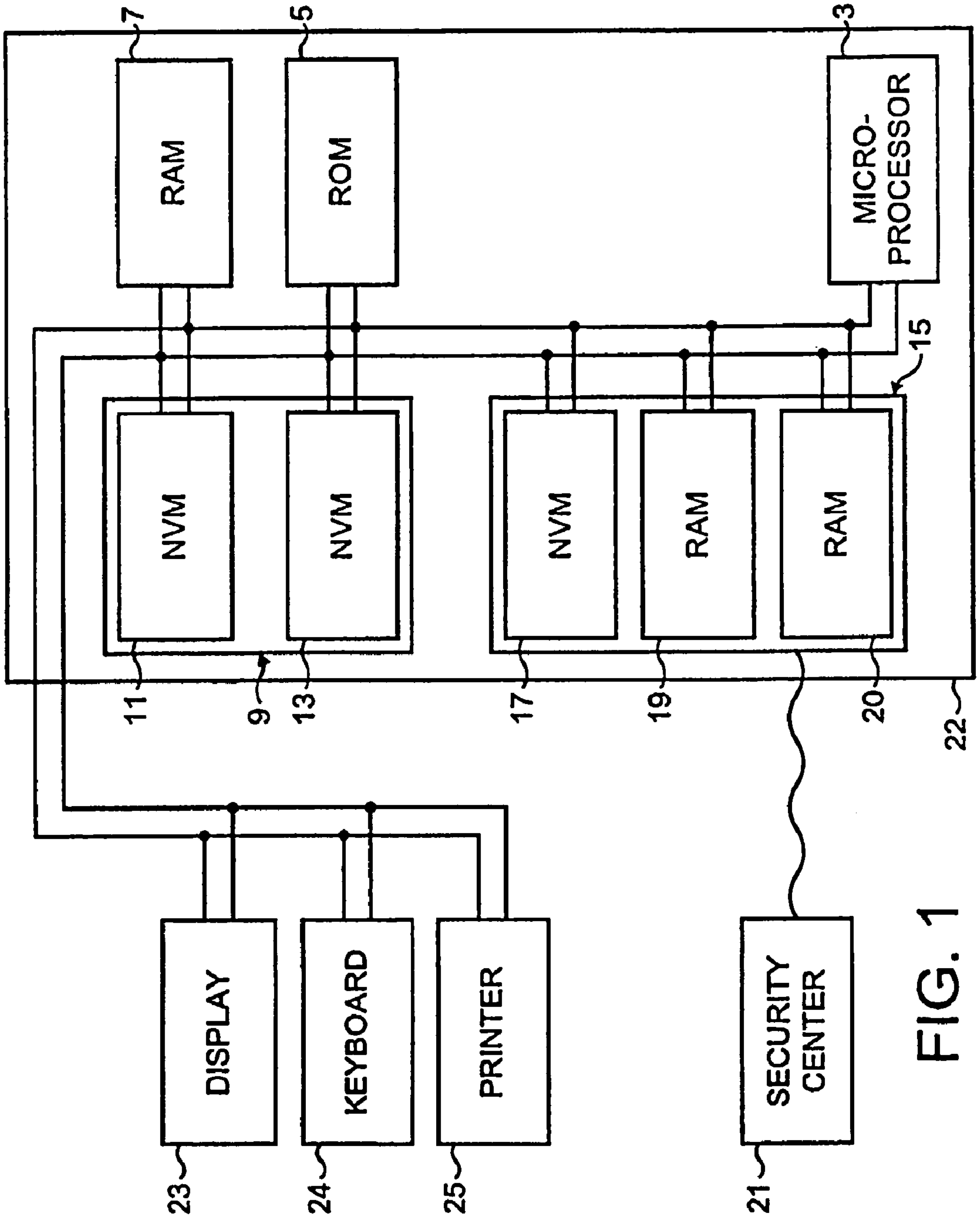
Figure 1:
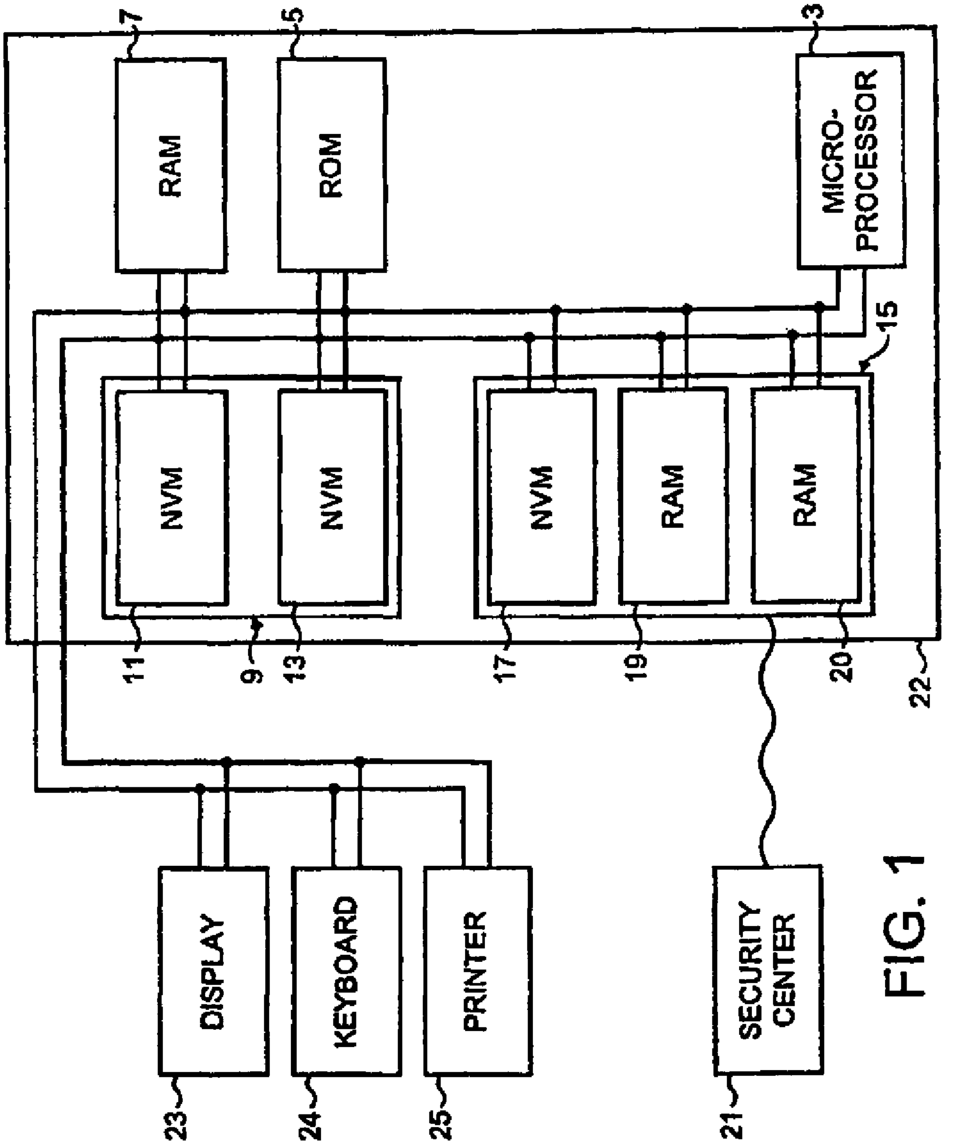

| | | | | |
|---|---|---|---|---|
| 2002/0032660 | A1* | 3/2002 | Dietrich et al. | 705/60 |
| 2006/0000883 | A1* | 1/2006 | Herring | 235/375 |
| 2006/0032910 | A1* | 2/2006 | Herring | 235/381 |
| 2006/0108410 | A1* | 5/2006 | Mattern | 235/375 |

FOREIGN PATENT DOCUMENTS

| | | |
|---|---|---|
| GB | 2 178 696 | 2/1987 |
| WO | 01/045051 | 6/2001 |

* cited by examiner

POSTAGE METERING SYSTEM

This application is a national phase of International Application No. PCT/GB03/00395 filed Jan. 31, 2003 and published in the English language.

The present invention relates to the security of a postage metering system, and in particular a postage metering system which requires the input of an operating code prior to printing indicia, and more particularly the input of a valid operating code prior to printing indicia.

It is an aim of the present invention to provide a postage metering system which provides for improved or at least alternative security.

In one aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, deny use of the system and one or both of log data relating to each such attempted use and report each such attempted use to a security center.

Preferably, the security module includes a memory for storing the at least one valid operating code.

Preferably, the at least one valid operating code comprises a personal identification number.

Preferably, the security module includes a memory for storing a data record of such attempted use.

In one embodiment the reporting occurs automatically in response to such attempted use.

In another embodiment the reporting occurs at intervals.

In another aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match and printing of an indicium is requested, cause the printer in a printing operation to print an indicium having a zero postage value and one or both of log data relating to such operation and report such operation to a security center.

Preferably, the security module includes a memory for storing the at least one valid operating code.

Preferably, the at least one valid operating code comprises a personal identification number.

Preferably, the accounting module is operative to account for postage value even when an invalid operating code has been input and the postage value applied to a mail item is at zero value.

Preferably, the security module includes a memory for storing a data record of such printing operations.

In one embodiment the reporting occurs automatically in response to any such printing operation.

In another embodiment the reporting occurs at intervals.

In a further aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, allow normal printing of indicia including postage value and one or both of log data relating to such use and report such use to a security center.

Preferably, the security module is configured one or both of to log data relating to such use and report such use to a security center when printing of an indicium is requested.

Preferably, the security module includes a memory for storing the at least one valid operating code.

Preferably, the at least one valid operating code comprises a personal identification number.

Preferably, the security module includes a memory for storing a data record of such use.

In one embodiment the reporting occurs automatically in response to any such use.

In another embodiment the reporting occurs at intervals.

Preferred embodiments of the present invention will now be described hereinbelow by way of example only with reference to the accompanying drawing, in which:

FIG. 1 diagrammatically illustrates a postage metering system in accordance with a preferred embodiment of the present invention.

The postage metering system comprises a microprocessor 3, a read-only memory (ROM) 5 storing program routines for operation of the microprocessor 3, and a random-access memory (RAM) 7 for use as a working store for the temporary storage of data during operation of the system.

The invention claimed is:

1. A postage metering system for applying indicia including postage value on mail items, the system including:
- a keyboard for inputting information;
- a printer for printing indicia;
- an accounting module for accounting for postage value applied to mail items; and
- a security module for requiring a user to input an operating code prior to further operation of the system, the security module being configured to compare the input operating code with at least one stored valid operating code, and, where the input operating code and any stored operating code do not match, allow normal printing of indicia including postage value and one or both of log data relating to such use and report such use to a security center.

2. The system of claim 1, wherein the security module is configured one or both of to log data relating to such use and report such use to a security center when printing of an indicium is requested.

3. The system of claim 1, wherein the security module includes a memory for storing the at least one valid operating code.

4. The system of claim 1, wherein the at least one valid operating code comprises a personal identification number.

5. The system of claim 1, wherein the security module includes a memory for storing a data record of such use.

6. The system of claim 1, wherein the reporting occurs automatically in response to any such use.

7. The system of claim 1, wherein the reporting occurs at intervals.

* * * * *

UNITED STATES PATENT AND TRADEMARK OFFICE

CERTIFICATE OF CORRECTION

PATENT NO. : 7,273,164 B2
APPLICATION NO. : 10/503178
DATED : September 25, 2007
INVENTOR(S) : Herring It is certified that error appears in the above-identified patent and that said Letters Patent is hereby corrected as shown below:

Please delete the patent in its entirety and replace with the new Title page, Drawings, and specification, claims as attached.

Signed and Sealed this
Seventh Day of June, 2011

David J. Kappos
*Director of the United States Patent and Trademark Office*

(12) United States Patent
Herring

(10) Patent No.: US 7,273,164 B2
(45) Date of Patent: Sep. 25, 2007

(54) POSTAGE METERING SYSTEM

(75) Inventor: William James Herring, Essex (GB)

(73) Assignee: Neopost Indutrie SA, Bagneux (FR)

(*) Notice: Subject to any disclaimer, the term of this patent is extended or adjusted under 35 U.S.C. 154(b) by 0 days.

(21) Appl. No.: 10/503,178

(22) PCT Filed: Jan. 31, 2003

(86) PCT No.: PCT/GB03/00395

§ 371 (c)(1),
(2), (4) Date: Aug. 24, 2005

(87) PCT Pub. No.: WO03/065314

PCT Pub. Date: Aug. 7, 2003

(65) Prior Publication Data

US 2006/0000883 A1 Jan. 5, 2006

(30) Foreign Application Priority Data

Jan. 31, 2002 (GB) ............................ 0202269.7

(51) Int. Cl.
*G06F 17/00* (2006.01)
*G06Q 99/00* (2006.01)
*H04K 1/00* (2006.01)
*H04L 9/00* (2006.01)
*G07B 17/02* (2006.01)

(52) U.S. Cl. ......................... 235/375; 705/60; 705/401

(58) Field of Classification Search ................ 235/375; 705/60, 401
See application file for complete search history.

(56) References Cited

U.S. PATENT DOCUMENTS 4,484,307 A * 11/1984 Quatse et al. ............... 705/410
4,629,871 A * 12/1986 Scribner et al. ............ 235/375
4,812,965 A 3/1989 Taylor
5,613,007 A * 3/1997 Balga, Jr. ..................... 380/51
5,671,146 A * 9/1997 Windel et al. ............... 705/410
5,745,887 A * 4/1998 Gargiulo et al. ............ 705/410
5,796,834 A 8/1998 Whitney et al.
5,917,924 A * 6/1999 Herbert ........................ 382/101
5,984,174 A * 11/1999 Kato et al. .................. 235/375
6,002,095 A * 12/1999 Bodie et al. ................. 209/584
6,039,257 A * 3/2000 Berson et al. ............... 235/468
6,587,843 B1 * 7/2003 Gelfer et al. ................. 705/60
2001/0039625 A1 * 11/2001 Ananda ...................... 713/202
2001/0044783 A1 * 11/2001 Weisberg et al. .............. 705/62
2002/0010688 A1 * 1/2002 Shah et al. ................. 705/405

(Continued)

FOREIGN PATENT DOCUMENTS

EP 0 782 110 7/1997

(Continued)

*Primary Examiner*—Daniel Walsh
(74) *Attorney, Agent, or Firm*—Renner, Otto, Boisselle & Sklar, LLP.

(57) ABSTRACT

A postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, one or both of log data relating to such use and report such use to a security center.

7 Claims, 1 Drawing Sheet

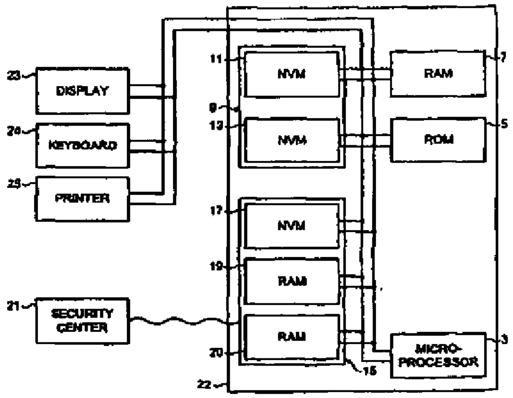

US 7,273,164 B2
Page 2

U.S. PATENT DOCUMENTS

| | | | | |
|---|---|---|---|---|
| 2002/0032660 | A1 * | 3/2002 | Dietrich et al. | 705/60 |
| 2006/0000883 | A1 * | 1/2006 | Herring | 235/375 |
| 2006/0032910 | A1 * | 2/2006 | Herring | 235/381 |
| 2006/0108410 | A1 * | 5/2006 | Mattern | 235/375 |

FOREIGN PATENT DOCUMENTS

| | | |
|---|---|---|
| GB | 2 178 696 | 2/1987 |
| WO | 01/045051 | 6/2001 |

* cited by examiner

POSTAGE METERING SYSTEM

This application is a national phase of International Application No. PCT/GB03/00395 filed Jan. 31, 2003 and published in the English language.

The present invention relates to the security of a postage metering system, and in particular a postage metering system which requires the input of an operating code prior to printing indicia, and more particularly the input of a valid operating code prior to printing indicia.

It is an aim of the present invention to provide a postage metering system which provides for improved or at least alternative security.

In one aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, deny use of the system and one or both of log data relating to each such attempted use and report each such attempted use to a security center.

Preferably, the security module includes a memory for storing the at least one valid operating code.

Preferably, the at least one valid operating code comprises a personal identification number.

Preferably, the security module includes a memory for storing a data record of such attempted use.

In one embodiment the reporting occurs automatically in response to such attempted use.

In another embodiment the reporting occurs at intervals.

In another aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match and printing of an indicium is requested, cause the printer in a printing operation to print an indicium having a zero postage value and one or both of log data relating to such operation and report such operation to a security center.

Preferably, the security module includes a memory for storing the at least one valid operating code.

Preferably, the at least one valid operating code comprises a personal identification number.

Preferably, the accounting module is operative to account for postage value even when an invalid operating code has been input and the postage value applied to a mail item is at zero value.

Preferably, the security module includes a memory for storing a data record of such printing operations.

In one embodiment the reporting occurs automatically in response to any such printing operation.

In another embodiment the reporting occurs at intervals.

In a further aspect the present invention provides a postage metering system for applying indicia including postage value on mail items, the system including: a keyboard for inputting information; a printer for printing indicia; an accounting module for accounting for postage value applied to mail items; and a security module for requiring a user to input an operating code prior to further operation of the system, the security module being configured to compare the input operating code with at least one stored valid operating code, and, where the input operating code and any stored operating code do not match, allow normal printing of indicia including postage value and one or both of log data relating to such use and report such use to a security center.

Preferably, the security module is configured one or both of to log data relating to such use and report such use to a security center when printing of an indicium is requested.

Preferably, the security module includes a memory for storing the at least one valid operating code.

Preferably, the at least one valid operating code comprises a personal identification number.

Preferably, the security module includes a memory for storing a data record of such use.

In one embodiment the reporting occurs automatically in response to any such use.

In another embodiment the reporting occurs at intervals.

Preferred embodiments of the present invention will now be described hereinbelow by way of example only with reference to the accompanying drawing, in which:

FIG. 1 diagrammatically illustrates a postage metering system in accordance with a preferred embodiment of the present invention.

The postage metering system comprises a microprocessor 3, a read-only memory (ROM) 5 storing program routines for operation of the microprocessor 3, and a random-access memory (RAM) 7 for use as a working store for the temporary storage of data during operation of the system.

The system further comprises an accounting module 9 for accounting for postage value applied to mail items. The accounting module 9 comprises duplicated non-volatile memories (NVMs) 11, 13 for storing accounting data relating to the dispensing of postage value, as applied to mail items, which is required to be retained even when the system is not powered. In this embodiment the NVMs 11, 13 each include inter alia an ascending tote register which represents the accumulated total of the postage value applied by the system in its lifetime, an item count register which represents the total number of mail items to which postage value has been applied by the system in its lifetime, a large items register which represents the total number of mail items to which a postage value in excess of a predetermined value has been applied by the system in its lifetime, a zero-value items register which represents the total number of mail items to which a zero-value postage value has been applied by the system in its lifetime, and a descending credit register which represents the value of credit which is available by the system. In an alternative embodiment the NVMs 11, 13 could include an ascending credit register instead of a descending credit register. By including a zero-value register which registers the number of zero-value imprints, the system can be interrogated to determine the frequency of attempted fraud.

The system further comprises a security module 15 for requiring the input of an operating code, in this embodiment a security code, prior to the printing of indicia.

Where a valid operating code is entered by a user, that is, where the input operating code matches a stored operating code, the system operates normally and indicia of any postage value can be applied to mail items.

In one mode, where an invalid operating code is input by a user, that is, where the input operating code does not match a stored operating code, use of the system is denied and such attempted use is logged for subsequent analysis. In another embodiment such attempted use is, additionally or alternatively, reported to a security center 21, as will be described in more detail hereinbelow. This reporting can occur automatically, at intervals, such as daily, or on request. Such reporting enables attempted use to be analysed, and, if desired, allow for intervention, particularly where attempted use is frequent in a short period, such as when a person may be attempting to determine the valid operating code through repeated attempted use.

In another mode, where an invalid operating code is input by a user, that is, where the input operating code does not match a stored operating code, the system operates normally, in the sense that indicia can be printed and the accounting module 9 performs the usual accounting functions, but the postage value applied to mail items is at zero value and such use is logged for subsequent analysis. In this way, where an invalid operating code is input by a user, the postage indicia obtainable from the system are ineffective as the postage value is a zero postage value, and there is no loss of credit as the postage value is a zero value. In one embodiment such use is, additionally or alternatively, reported to a security center 21, as will be described in more detail hereinbelow. This reporting can occur automatically, at intervals, such as daily, or on request. Such reporting enables such use to be analysed, and, if desired, allows for intervention. In allowing for the operation of the system, albeit with postage indicia at zero value, information is obtained as regards each operation, for example, information as to class, weight, destination, etc which can be utilised in analysing the fraudulent use.

In a further mode, where an invalid operating code is input by a user, that is, where the input operating code does not match a stored operating code, the system operates normally, in the sense that indicia can be printed and the accounting module 9 performs the usual accounting functions, but such use is logged for subsequent analysis. In this way, the user perceives that his/her fraudulent use is going undetected, when, in fact, the use is being logged for subsequent forensic analysis. In one embodiment such use is, additionally or alternatively, reported to a security center 21, as will be described in more detail hereinbelow. This reporting can occur automatically, at intervals, such as daily, or on request. Such reporting enables such use to be analysed, and; if desired, allows for intervention, in one embodiment immediately. In allowing for the operation of the system, information is obtained as regards each operation, for example, information as to class, weight, destination, etc which can be utilised in analysing the fraudulent use.

The security module 15 comprises a non-volatile memory (NVM) 17 for storing valid operating codes against which operating codes input by users are to be compared. In this embodiment the system is configured such that valid operating codes can be programmed in the NVM 17 when operated in a supervisor mode. In an alternative embodiment the valid operating codes in the NVM 17 can be factory set.

The security module 15 further comprises a first random-access memory (RAM) 19 for storing the operating code which is input by a user and is subsequently compared to the valid operating codes stored in the NVM 17.

The security module 15 further comprises a second random-access memory (RAM) 20 for storing data, in one mode relating to entry of an invalid operating code, and in other modes relating to any use performed when an invalid operating code has been entered by a user.

In this embodiment the security module 15 is connected, here by a communications link, to a remote security center 21, such as to allow for downloading of records for analysis, and in addition, or alternatively, provide a report of any use or attempted use to the security center 21. In one embodiment a report can be communicated at each instance. In another embodiment communication can be at intervals, for example, hourly, daily or weekly.

In this embodiment the operating codes are machine-related codes. In an alternative embodiment the operating codes could comprise personal identification numbers (PINs), such that each user has a unique operating code.

In this embodiment the microprocessor 3, the ROM 5, the RAM 7, the accounting module 9 and the security module 15 are all housed in a secure housing 22.

The system further comprises a display 23 for displaying information, a keyboard 24 for inputting information, and a printer 25 for printing indicia on mail items.

In operation, a user is first required to enter an operating code via the keyboard 24.

Where a valid operating code is entered by a user, the system operates normally and indicia of any postage value can be applied to mail items.

In one mode, where an invalid operating code is input by a user, that is, where the input operating code does not match a stored operating code, the system remains inoperable and logs such attempted use for subsequent analysis. In one embodiment such attempted use is, additionally or alternatively, reported to a security center 21. Such reporting enables attempted access to be analysed, and, if desired, allows for intervention, particularly where attempted access is frequent, such as when a person may be attempting to determine the valid operating code through repeated attempted use.

In another mode, where an invalid operating code is input by a user, that is, where the input operating code does not match a stored operating code, the system operates normally, in the sense that indicia can be printed and the accounting module 9 performs the usual accounting functions, but the postage value applied to mail items is at zero value and such use is logged for subsequent analysis. In one embodiment such use is, additionally or alternatively, reported to a security center 21. Such reporting enables such use to be analysed, and, if desired, allows for intervention. In allowing for the operation of the system, albeit with postage indicia at zero value, information is obtained as regards each operation, for example, information as to class, weight, destination, etc which can be utilised in analysing the fraudulent use.

In a further mode, where an invalid operating code is input by a user, that is, where the input operating code does not match a stored operating code, the system operates normally, in the sense that indicia can be printed normally and the accounting module 9 performs the usual accounting functions, but such use is logged for subsequent analysis. In one embodiment such use is, additionally or alternatively, reported to a security center 21. Such reporting enables such use to be analysed, and, if desired, allows for intervention, in one embodiment immediately. In allowing for the operation of the system, information is obtained as regards each operation, for example, information as to class, weight, destination, etc which can be utilised in analysing the fraudulent use.

This mode of operation in particular allows habitual fraudulent use to be detected, as a user, who perceives that he/she has unfettered access, will likely habitually use the postage metering system.

Finally, it will be understood that the present invention has been described in its preferred embodiments and can be modified in many different ways without departing from the scope of the invention as defined by the appended claims.

The invention claimed is:

1. A postage metering system for applying indicia including postage value on mail items, the system including:

a keyboard for inputting information;

a printer for printing indicia;

an accounting module for accounting for postage value applied to mail items; and a security module for requiring a user to input an operating code prior to further operation of the system, the security module being configured to compare the input operating

US 7,273,164 B2

5 code with at least one stored valid operating code, and, where the input operating code and any stored operating code do not match, allow normal printing of indicia including postage value and one or both of log data relating to such use and report such use to a security center.

2. The system of claim 1, wherein the security module is configured one or both of to log data relating to such use and report such use to a security center when printing of an indicium is requested.

3. The system of claim 1, wherein the security module includes a memory for storing the at least one valid operating code.

6

4. The system of claim 1, wherein the at least one valid operating code comprises a personal identification number.

5. The system of claim 1, wherein the security module includes a memory for storing a data record of such use.

6. The system of claim 1, wherein the reporting occurs automatically in response to any such use.

7. The system of claim 1, wherein the reporting occurs at intervals.

* * * * *